(12) United States Patent
Ritter et al.

(10) Patent No.: US 11,120,155 B2
(45) Date of Patent: Sep. 14, 2021

(54) EXTENSIBILITY TOOLS FOR DEFINING CUSTOM RESTRICTION RULES IN ACCESS CONTROL

(71) Applicant: SAP SE, Walldorf (DE)

(72) Inventors: Gerd M. Ritter, Heidelberg (DE); Bernd Fleddermann, Walldorf (DE)

(73) Assignee: SAP SE, Walldorf (DE)

( * ) Notice: Subject to any disclaimer, the term of this patent is extended or adjusted under 35 U.S.C. 154(b) by 318 days.

(21) Appl. No.: 15/830,342

(22) Filed: Dec. 4, 2017

(65) Prior Publication Data

US 2019/0171842 A1 Jun. 6, 2019

(51) Int. Cl.
*G06F 21/62* (2013.01)
*G06F 21/45* (2013.01)
*G06F 21/60* (2013.01)

(52) U.S. Cl.
CPC .......... *G06F 21/6245* (2013.01); *G06F 21/45* (2013.01); *G06F 21/604* (2013.01)

(58) Field of Classification Search
CPC ..... G06F 21/6245; G06F 21/45; G06F 21/604
See application file for complete search history.

(56) References Cited

U.S. PATENT DOCUMENTS

| 7,185,192 | B1* | 2/2007 | Kahn | G06F 21/6218 707/999.003 |
|---|---|---|---|---|
| 7,565,376 | B2 | 7/2009 | Stegmann et al. | |
| 7,624,340 | B2 | 11/2009 | Ritter | |
| 7,630,969 | B2 | 12/2009 | Ritter | |
| 7,680,783 | B2 | 3/2010 | Ritter et al. | |
| 7,689,904 | B2 | 3/2010 | Ritter | |
| 7,844,912 | B2 | 11/2010 | Kornmann | |
| 7,966,566 | B2 | 6/2011 | Ritter et al. | |
| 8,046,389 | B2 | 10/2011 | Ritter | |
| 8,099,661 | B2 | 1/2012 | Ritter | |
| 8,108,433 | B2 | 1/2012 | Baeuerle et al. | |
| 8,555,248 | B2 | 10/2013 | Brunswig et al. | |
| 8,606,723 | B2 | 12/2013 | Seubert et al. | |
| 8,655,756 | B2 | 2/2014 | Seubert et al. | |
| 8,661,356 | B2 | 2/2014 | Demant et al. | |
| 8,689,119 | B2 | 4/2014 | Ritter et al. | |
| 8,694,397 | B2 | 4/2014 | Seubert et al. | |
| 8,706,804 | B2 | 4/2014 | Kornmann et al. | |

(Continued)

*Primary Examiner* — Shin-Hon (Eric) Chen
*Assistant Examiner* — Jessica J South
(74) *Attorney, Agent, or Firm* — Fish & Richardson P.C.

(57) ABSTRACT

Extensibility tools are provided to customers for defining custom restriction rules for enhanced access controls. In an example method, a listing of restriction rules available for a business role are presented. The restriction rules include predefined restriction rules and at least one custom restriction rule placeholder, wherein the predefined restriction rules are delivered with the enterprise software system the at least one customer restriction rule placeholders are associated with a link to custom code developed as a customer-specific restriction rule. A selection of a particular custom restriction rule is received and associated with the particular business role. When evaluating the restriction rule, the custom code and a set of master data defined in the custom code is accessed to determine restrictions for each of the end users associated with the business role. A set of access objects are derived for each user based on the information.

18 Claims, 5 Drawing Sheets

(56) References Cited

U.S. PATENT DOCUMENTS

| | | |
|---|---|---|
| 8,745,690 B2 | 6/2014 | Brunswig et al. |
| 8,893,031 B2 | 11/2014 | Kornmann et al. |
| 8,930,363 B2 | 1/2015 | Bettin et al. |
| 8,949,855 B2 | 2/2015 | Bettin et al. |
| 9,020,881 B2 | 4/2015 | Ritter et al. |
| 9,020,973 B2 | 4/2015 | Stumpf et al. |
| 9,032,001 B2 | 5/2015 | Stumpf et al. |
| 9,052,845 B2 | 6/2015 | Brandt |
| 9,053,445 B2 | 6/2015 | Brunswig et al. |
| 9,069,805 B2 | 6/2015 | Ritter et al. |
| 9,135,319 B2 | 9/2015 | Ritter et al. |
| 9,158,932 B2 | 10/2015 | Ritter et al. |
| 9,170,780 B2 | 10/2015 | Gieselmann et al. |
| 9,191,343 B2 | 11/2015 | Stollarski et al. |
| 9,191,357 B2 | 11/2015 | Stollarski et al. |
| 9,213,856 B2 | 12/2015 | Kornmann et al. |
| 9,286,578 B2 | 3/2016 | Ritter et al. |
| 9,396,446 B2 | 7/2016 | Ritter et al. |
| 9,459,846 B2 | 10/2016 | Bornheimer et al. |
| 2009/0097661 A1* | 4/2009 | Orsini ............... G06F 21/45 380/279 |
| 2014/0137188 A1* | 5/2014 | Bartholomay ....... H04L 65/40 726/3 |
| 2014/0289207 A1* | 9/2014 | Moloian ........... G06F 16/2365 707/687 |
| 2018/0069899 A1* | 3/2018 | Lang ................. G06F 8/38 |

\* cited by examiner

EXTENSIBILITY TOOLS FOR DEFINING CUSTOM RESTRICTION RULES IN ACCESS CONTROL

BACKGROUND

The present disclosure relates to a system and computerized method for providing extensibility tools to customers for defining custom restriction rules to provide for enhanced access controls to organizational or business documents and files.

Many applications and processes provide access control based on user management, business roles, and access rights based on relationships and positions assigned in organizational sets of master data. In general, master data represents data objects (e.g., business objects) which are agreed on and shared across an enterprise. Master data can define relatively static reference data, transactional, unstructured, analytical, and metadata. Master data can support transactional processes and operations, and may define information related to customers, products, employees, materials, suppliers, vendors, sales, and other information. Information related to an organizational model, including employee master data, territory master data, and account master data can be used to define various relationships and rules for one or more users.

SUMMARY

Implementations of the present disclosure are generally directed to providing extensibility tools to customers for defining custom restriction rules enabling enhanced and customizable access controls. In one example implementation, a computerized method executed by hardware processors can be performed. The example method can comprise presenting, via a user interface, a listing of a plurality of restriction rules for association with a particular business role, the business role associated with at least one end user in an enterprise software system executed by a customer, the listing of the plurality of restriction rules including at least one predefined restriction rule and at least one custom restriction rule placeholder, wherein each of the at least one predefined restriction rules are delivered with the enterprise software system and defined by a software vendor providing the enterprise software system, and wherein each of the at least one customer restriction rule placeholders are associated with a link to custom code developed as a customer-specific restriction rule. An indication of a selection of a particular custom restriction rule placeholder from the listing of the plurality of restriction rules is received via the user interface. The selected particular custom restriction rule placeholder is associated with the particular business role. In response to a triggering event associated with the evaluation of the restriction rule for the particular business role, several operations can be performed. The custom code linked to the particular custom restriction rule placeholder can be accessed. A set of master data defined in the custom code used to determine restrictions to be associated with each of the end users associated with the particular business role can be accessed. Based on logic defined within the custom code, a set of access objects associated with the accessed set of master data to be associated with each end user can be derived. For each end user associated with the identified business role, an end user authorization identifying the set of access objects authorized for the particular end user to access at runtime is generated.

Implementations can optionally include one or more of the following features. In some instances, at least a portion of the master data associated with the custom code comprises customer-defined master data defined by the customer after delivery of the enterprise software system.

In other instances, the triggering event can comprise a save action associated with an updated business role after the association of the selected custom restriction rule. In other instances, the triggering event can comprise a periodic restriction rule evaluation. In still other instances, the triggering event can comprise an assignment of a new business role to a user.

In some instances, the method may further comprise, in response to receiving the request at runtime for a first set of data associated with a first end user, determining a subset of the requested first set of data included in the generated end user authorization and providing the subset of the requested first set of data in the response to the request.

In some instances, the listing of the plurality of restriction rules including at least one custom restriction rule placeholder provided by a partner to the customer, the at least one customer restriction rule placeholder provided by the partner developed as a partner-defined restriction rule and made available for use by the customer.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
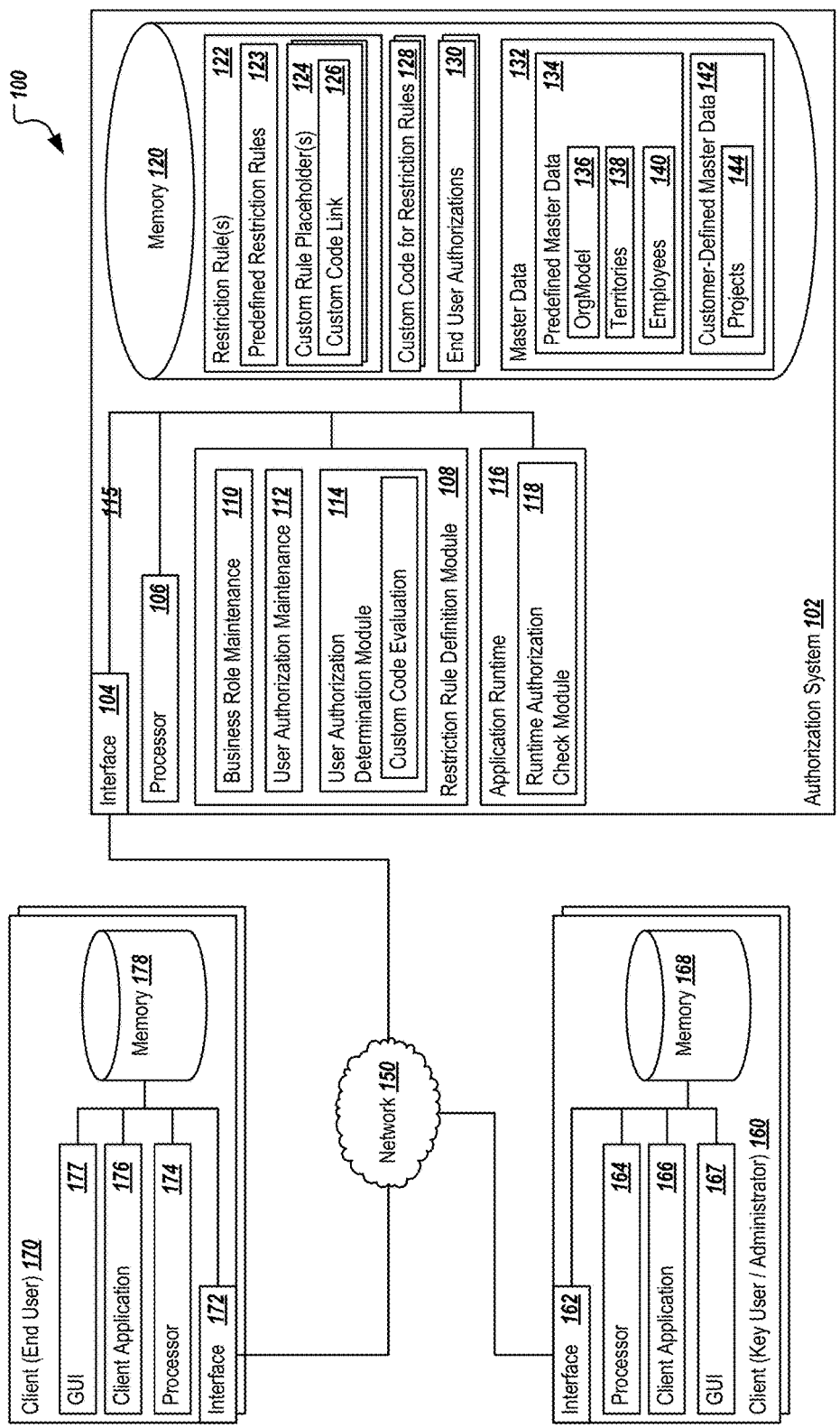
FIG. 1 is a block diagram illustrating an example system for providing extensibility tools to customers for defining custom restriction rules to provide for enhanced access controls.

The present disclosure describes systems and methods for implementing a solution for providing extensibility tools to customers for defining custom restriction rules to provide for enhanced access controls to organizational documents and files.

User restrictions to particular documents and data can be maintained in most business and enterprise systems by manual assignment. For example, to maintain particular authorizations for quotes (e.g., quote business objects), a key user or administrator can select specific objects to which a user is allowed access, such as employees, territories, or sales organizations. The user can then only see quotes that correspond to those defined employees, territories, or sales organizations. However, often enterprises do not want to maintain and update particular selections for each employee, individual, or user manually. The term "user" may be used for persons having accounts in a particular enterprise system. For example, an external consultant of a first company may be able to log onto the business systems of a second company when they are working for the second company as part of a contract or assignment. This consultant can be considered as user, but may not be an employee of the company. In various locations where "employee" is used, the term "user" may be used instead in many instances. Instead, current systems can allow administrators or key users (e.g., users with the ability to configure particular access rights to documents and objects) to derive access rights based on existing master data. For example, if a key user wants to define that all users with a particular business role XY shall have access to quotes where they are the employee or where they belong to a territory-based team associated with the quote, then a pre-delivered restriction rule can be provided by a developer of the application, possibly entitled "Employee and Assigned Territories". The restriction rule is called in order to determine the appropriate authorization of end users (e.g., usually prior to runtime to avoid delays), where each end user associated with business role XY is then associated with access authorizations for quotes where particular users with the business role XY can see quotes associated with the user themselves or the user's assigned territories. The end user authorizations can be accessed at runtime to determine a user's appropriate authorizations prior to providing the user data. Note that users having the same business role still often have different authorizations, since their relevant master data differs (e.g., a different employee or part of different territory teams).

However, the logic identifying how to derive the access-relevant objects is hard coded by the predefined restriction rules. The key user can select among the predefined restriction rules delivered by the software vendor or developer, but does not have the ability to modify or create new or additional restrictions rules themselves. Often, for instance, the business or real-world operations of an organization might make a deviation necessary which the software vendor has not foreseen. For example, a restriction rule that may be relevant to a particular organization that is not provided by the software vendor may be a restriction rule where users not only get authorizations for his or her own territory, but also of employees on the user's team. In still other instances, administrators and key users of a particular organization may define new master data that is not included in the original software provided by the software vendor, such that no restriction rules relevant to that master data have been or could have been provided in the predefined restriction rules.

While the software vendor is unable to provide such restriction rules out of the box, the present solution described herein provides one or more placeholder or dummy restriction rules in the predefined set of restriction rules. Alternatively, the key user may be able to create new boxes or entries for new custom restriction rules (e.g., each with an increasing ID). Administrators and key users of a particular organization can program, via code exits associated with these placeholder restriction rules, their custom use case. The custom restriction rule can then be evaluated at a suitable time and made available for use at runtime. When the custom restriction rule is selected by an administrator or key user in association with a particular business role, a user authorization determination module can be executed to update a stored set of end user authorizations for the particular users. The custom restriction rule can identify an identifier of a particular user corresponding to the role and the particular master data to be evaluated (e.g., existing master data delivered by the software vendor or newly defined master data specific to the customer, such as new business objects created by the customer after delivery of the software from the vendor). Based on the custom-defined logic associated with the rule, a set of objects that will be allowed to be accessed by users associated with the business role (e.g., business role XY) corresponding to the custom restriction rule are defined. When the custom code defining the restriction rule associated with the placeholder is evaluated, the corresponding authorizations of users having said business role can be determined and stored for runtime usage.

One clear advantage of the described solution is that customers are no longer beholden to the predefined restriction rules provided by the software vendor. Instead, customers are now enabled to tailor access restrictions according to their business requirements. Further, software vendors may be freed from being forced to continually provide updates to customers including specifically-requested restriction rules that may be relevant to handful of (or a single) customers. Further, the customer can use their own master data (i.e., not delivered by the vendor) to define particular access restrictions. Additionally, customers may be able to tailor access restrictions to their personal or enterprise's needs without needing to fall back to over-generalized authorizations provided by a vendor or to the tediously-defined, user-specific authorizations.

Turning to the illustrated implementation, FIG. 1 is a block diagram illustrating an example system 100 for implementing the extensibility tools to customers to allow them to define custom restriction rules to provide for enhanced access controls within an enterprise system. As illustrated in FIG. 1, system 100 is associated with an authorization system 102 for managing authorizations to particular objects and master data based on business roles and the specific definitions and associations of particular users. The system 100 can allow the illustrated components to share and communicate information across devices and systems (e.g., authorization system 102, clients 160 and 170, among others, via network 150). In some instances, at least some or all of the components may be cloud-based components or solutions, while in others, non-cloud systems may be used. In some instances, non-cloud-based systems, such as on-premise systems, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, authorization system 102 and clients 160, 170 may be any computer or processing device such as, for example, a blade server, general-purpose personal computer (PC), Mac®, workstation, UNIX-based workstation, or any other suitable device. Moreover, although FIG. 1 illustrates a single authorization system 102, the system 100 can be implemented using a single system or more than those illustrated, as well as computers other than servers, including a server pool. In other words, the present disclosure contemplates computers other than general purpose computers, as well as computers without conventional operating systems. Similarly, the clients 160 and 170 may be any system which can request data and/or interact with the authorization system 102. The clients 160 and 170, in some instances, may each or either be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others.

In general, the authorization system 102 may be associated with the execution of one or more authorization modules and analyses associated with various users and restriction rules that are applied to certain documents and files in an organization. In some instances, the authorization system 102 may be associated with or can execute an enterprise application, including but not limited to an enterprise resource planning (ERP) system, a customer relationship management (CRM) system, a supplier relationship management (SRM) system, a supply chain management (SCM) system, a product lifecycle management (PLM) system, or any other suitable system. In some instances, authorization system 102 may be associated with or can execute a combination or at least some of these systems to provide an end-to-end enterprise application or portions thereof.

As illustrated, the authorization system 102 is associated with a plurality of restriction rules 122 (shown within memory 120) that allow the system 102 to determine what documents, files, and information a specific user or specific set of users can access. Each user can be associated with one or more business roles, where those business roles define some relationship to or position within the enterprise associated with the authorization system 102. Instead of associating specific access rules identifying specific individual data sets and documents that an individual user can access, the restriction rules 122 can be used to define access rights to a particular business role, where the rights associated with the particular business role are then applied to end users to whom the particular business roles have been assigned. The restriction rules 122 associated with the particular business role are then applied to users who have this business role assigned. In one example, a restriction rule may be associated with a business role "Manager," where the restriction rule indicates or defines that users with the business role "Manager" can be provided access to sales quotes associated with individuals in groups in which those users are defined as a manager. At intervals or in response to a request to run a runtime authorization calculation, the restriction rules can be run for particular sets of users based on their assigned or associated business roles and existing master data identifying the groups or individuals who are under the supervision of a particular manager. Based on that information, authorizations for the particular manager for sales quotes documents belonging to a certain group of users can be generated and stored in the end user authorizations 130. When the manager attempts to access one of the backend applications, such as to access a worklist or view associated with particular sales quotes, the end user authorizations 130 will include an indication that the manager is allowed to see those particular sales quotes, and can present them upon request to the manager.

As illustrated, the restriction rules 122 includes a number of predefined restriction rules 123 provided by the software vendor to address many of the common solutions required by a plurality of customers, as well as a set of custom rule placeholders 124 that can be used to allow customers to define their own unique business-specific restriction rules. The predefined restriction rules 123 can be rules that were previously requested by customers that can be applied to existing or predefined master data 134 shared by different customers. The predefined restriction rules 123 can address the most popular or the most likely options for restriction rules, but may not address specific business or organizational needs of customers, and may not address customer-specific or customer-defined master data 142 (e.g., where master data has been modified, enhanced, or newly added after delivery of the software associated with the authorization system 102), as such customer-defined master data 142 would not be foreseeable or a standard part of the underlying software. In those instances, the restriction rules 122 can include one or more custom rule placeholders 124 that can be used by a key user or administrator of the customer (e.g., via client 160) to define uniquely configured restriction rules not available from a provided set of predefined restriction rules 123 from the software vendor. In other instances, new restriction rules can be added (as opposed to the custom rule placeholders 124) with identifiers in a separate namespace. In other words, all restriction rules with IDs in a particular namespace can be reserved for customer definition.

In generating the custom restriction rules represented by the customer rule placeholders 124, the customer (e.g., the key user or administrator) can prepare or use any suitable method of coding or defining the custom restriction rule. In doing so, the particular custom rule placeholder 124 can be associated with a custom code link 126 that identifies or otherwise links to the custom code 128 to be executed when a particular custom restriction is assigned to a role and when the user authorization determination operations are executed. The custom code 128 may be prepared, coded, modeled, coded and modeled, or otherwise identified by the customer (e.g., the key user, administrator, etc.) in any suitable format. In some instances, standard connection methods (e.g., a set of standard APIs) can be used to access the data needed to perform the search. The custom code 128 can be modeled using, for example, a rule framework or a maintenance table, or can be implemented (e.g., unique coding by the customer, use of a particular APIs, etc.) in one or more new or existing interfaces to define the logic of the custom code 128 for the custom restriction rule. In creating the custom code, an identifier of an end user can be identified as the input to the code. The identifier may be a unique identifier that can be used to identify particular end users, such as a particular UUID, an employee number, a government-issued identifier, or any other identifier that can be assessed from the set of master data 132 to uniquely identify a particular user. The custom code 128 can then identify and provide access to the particular master data 132 to be considered in the newly defined custom restriction rule. The custom code 128 used to access particular master data 132 can be a set of predefined APIs or other connection methods provided by the software vendor with the delivery of the enterprise software in some instances. In other instances, any suitable code used to connect to particular master data 132 to be associated with the custom restriction rule can be used, including any suitable programming language or connection methods. In general, the custom code 128 indicates that the code related to a particular restriction rule 122 is not provided by the software vendor. The custom code 128 may be defined in any suitable manner, including via one or more user interfaces or configuration tables, as well as through specific coding (e.g., Java, JavaScript, C++, C#, etc.), which are used to access the corresponding master data 132 associated with the logic of the custom restriction rule. In one example, the custom code 128 may perform actions such that users get access to documents of all employees in his or her team except for employees with a dedicated code or definition on some extension field. By using the extension fields, the custom code 128 can consider information not available to the vendor or developer.

As illustrated in FIG. 1, the set of master data 132 can include a set of predefined master data 134 provided by the software vendor. Examples in FIG. 1 includes an Organization Model 136, information on Territories 138, and information on Employees 140. In creating a custom restriction rule for the predefined master data 134, the customer can create custom restriction rules that use the predefined master data 134 in different combinations or based on different authorization logic than those predefined restriction rules 123 provided by the software vendor. As illustrated, during the use of the enterprise software, customers may have the opportunity to generate or extend the set of master data 132 to include various customer-defined master data 142. The customer-defined master data 142 represents newly defined master data that can be used by the customer but that is not necessarily shared by other customers of the software vendor. As illustrated in FIG. 1, a new business object Projects 144 has been defined for the current customer, where Projects 144 master data defines information about particular projects and their teams and/or the subject matter of the project itself. Because this master data 142 is customer-defined and not available during the development of the enterprise software, the software vendor would not be able to predefine restriction rules that use the Project master data 144 in its authorization considerations. Based on this, restriction rules considering such customer-defined master data 142 can only be provided using the customer-defined custom code 128 accessible via the custom rule placeholders 124. In some instances, the restriction rules 122 may further access business configuration data defined for particular configurations at different customers.

Once the connection to particular master data 132 (e.g., either predefined 134 or customer-defined 142), the particular logic used to derive the access objects and end user authorizations 130 of particular users is defined. Again, the custom code 128 can be used to provide any suitable logic and analysis of the available and identified master data for a particular end user to determine how the authorizations 130 are to be made available. In general, the custom code 128 can be used to define different logical rules or analyses than those of the predefined restriction rules 123.

Once the custom code 128 is completed, the code 128 can be connected or associated with the custom rule placeholder 124 via a custom code link 126. The custom code link 126 may be a hyperlink, an identifier, a storage path, or other identifier(s) pointing to or referencing the location of the particular custom code 128 associated with a particular custom rule placeholder 124. When a particular business role is associated with the particular custom rule placeholder 124, the system (i.e., the user authorization determination module 114 via custom code evaluation module 115) can access the corresponding custom code 124 defined by the custom code link 126 and generate one or more evaluations of the authorizations. The custom code evaluation module 115 may be triggered when a particular business role is associated with a custom rule placeholder 124, which in turn is associated with a custom code link 126. The user authorization determination module 114 can exit its normal procedure for evaluating the predefined restriction rules 123, and can instead perform operations to access the custom code 128 for the particular restriction rule and perform user authorization evaluations based on the custom code 128. The results of those evaluations can then be stored with the end user authorizations 130, where those end user authorizations 130 are then evaluated at runtime when particular information is requested. In addition, the particular custom rule placeholder 124 associated with the custom code 128 can be renamed or associated with a name for presentation.

While the illustrated solution is defined as a particular customer generating the custom code for the custom restriction rules 128, in some instances, entities other than the software vendor and the particular customer may generate the custom code 128. For example, a partner or other customer may define one or more custom restriction rules using the same, similar, or a different process. Those custom restriction rules can be incorporated into the illustrated customer system and applied to the customer's data and end users, where appropriate.

The stored information and code described herein can be stored in memory 120 of the authorization system 102. Memory 120 may represent a single memory or multiple memories. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data (e.g., the restriction rules 122, the custom code 128, the end user authorizations 130, and the master data 132, as well as others, etc.), including financial data, user information, administrative settings, password information, caches, applications, backup data, repositories storing business and/or dynamic information, and any other appropriate information associated with the authorization system 102, including any parameters, variables, algorithms, instructions, rules, constraints, or references thereto. Additionally, the memory 120 may store any other appropriate data, such as VPN applications, firmware logs and policies, firewall policies, a security or access log, print or other reporting files, as well as others. While illustrated within the authorization system 102, some or all of memory 120 may be located remote from the authorization system 102 in some instances, including as a cloud application or repository, or as a separate cloud application or repository when the authorization system 102 itself is a cloud-based system. In some instances, particularly in enterprise systems, the master data 132 may be stored in a centralized repository to allow access to various applications and components in an end-to-end system. Similarly, the end user authorizations 130 may be stored separately, in some instances. With that said, the authorization system 102 and its operations may be able to access any and all relevant data via internal connections and/or through connections to network 150, where appropriate.

Returning generally to the authorization system 102, the authorization system 102 includes interface 104, processor 106, restriction rule definition module 108, application runtime 116, and the memory 120. The interface 104 is used by the authorization system 102 for communicating with other systems and components in a distributed environment— including within the environment 100—connected to the network 150, e.g., one or more clients 160, 170, as well as other systems communicably coupled to the illustrated authorization system 102 and/or network 150. Generally, the interface 104 comprises logic encoded in software and/or hardware in a suitable combination and operable to communicate with the network 150 and other components. More specifically, the interface 104 may comprise software supporting one or more communication protocols associated with communications such that the network 150 and/or interface's hardware is operable to communicate physical signals within and outside of the illustrated environment 100. Still further, the interface 104 may allow the authorization system 102 to communicate with one or more clients 160, 170 regarding particular authorization-related operations, as described in the present disclosure.

Network 150 facilitates wireless or wireline communications between the components of the environment 100 (e.g., between the authorization system 102 and a particular client 160, 170), as well as with any other local or remote computer, such as additional mobile devices, clients (e.g., client 160, 170), servers, databases, or other devices or components communicably coupled to network 150, including those not illustrated in FIG. 1. In the illustrated environment, the network 150 is depicted as a single network, but may be comprised of more than one network without departing from the scope of this disclosure, so long as at least a portion of the network 150 may facilitate communications between senders and recipients. In some instances, one or more of the illustrated components (e.g., the authorization system 102) may be included within network 150 as one or more cloud-based services or operations. The network 150 may be all or a portion of an enterprise or secured network, while in another instance, at least a portion of the network 150 may represent a connection to the Internet. In some instances, a portion of the network 150 may be a virtual private network (VPN). Further, all or a portion of the network 150 can comprise either a wireline or wireless link. Example wireless links may include 802.11a/b/g/n/ac, 802.20, WiMax, LTE, and/or any other appropriate wireless link. In other words, the network 150 encompasses any internal or external network, networks, sub-network, or combination thereof operable to facilitate communications between various computing components inside and outside the illustrated environment 100. The network 150 may communicate, for example, Internet Protocol (IP) packets, Frame Relay frames, Asynchronous Transfer Mode (ATM) cells, voice, video, data, and other suitable information between network addresses. The network 150 may also include one or more local area networks (LANs), radio access networks (RANs), metropolitan area networks (MANs), wide area networks (WANs), all or a portion of the Internet, and/or any other communication system or systems at one or more locations.

The authorization system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the authorization system 102, in particular those related to the restriction rule definition module 108 and/or the application runtime 116. Specifically, the processor(s) 106 executes the algorithms and operations described in the illustrated figures, as well as the various software modules and functionality, including the functionality for sending communications to and receiving transmissions from clients 160, 170, as well as to other devices and systems. Each processor 106 may have a single or multiple core, with each core available to host and execute an individual processing thread.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

In general, the authorization system 102 may be associated with the execution of one or more authorization operations and functionality, including the restriction rule definition module 108 and the application runtime 116. The restriction rule definition module 108 of the authorization system 102 can perform operations to allow customers and their users to associate particular users and business roles with one or more restriction rules 122, create one or more customer-specific and custom restriction rules defined by custom code 128, and to generate a set of end user authorizations 130 for one or more end users based on the restriction rules defined for the particular end users and/or for those defined as described above. Further, the authorization system 102 can evaluate requests provided at runtime via an application runtime 116 used to access particular functionality associated with the enterprise software.

The restriction rule definition module 108 can perform various operations and activities associated with the creation and assignment of various restriction rules. As illustrated, the restriction rule definition module 108 includes a business role maintenance module 110, a user authorization maintenance module 112, and the user authorization determination module 114. The business role maintenance module 110 can be used to maintain and modify one or more business roles within the enterprise software. The business role maintenance module 110 can be used by administrators and key users to define or modify one or more business roles. As describes, business roles are typically not specific to a single user (although in practice, they may), but represent a common role performed by a plurality of end users. Example business roles may include "Manager", "Technician," and "Key User," among others. As particular business roles are defined, one or more particular restriction rules 122 can be associated with particular business roles to allow groups of users to be dynamically assigned rights as opposed to manually assigning individuals such authorizations. Once particular restriction rules 122 are assigned to particular business roles using the business role maintenance module 110, the business role can be stored for future applications. The user authorization maintenance module 112 can be used to assign particular business roles to end users, or modify current business roles associated with a user.

A periodic or triggered operation performed by the user authorization determination module 114 can identify particular users associated with a business role and perform the operations to dynamically determine, based on the particular end user, their assigned business role(s), and their specific associations within the master data as defined by the restriction rule(s) 122 associated with the assigned business role, the corresponding set of end user authorizations 130 associated with each end user. The operations of the user authorization determination module 114 can be triggered in response to any particular event, including on a save action performed by a key user in response to a particular restriction rule 122 being associated with a particular business role, periodically based on a predetermined timeline or on a schedule, or in response to particular detected events, including a manual indication from a key user or administrator to update the end user authorizations 130. In some instances, later executions of the user authorization determination module 114 may not modify the end user authorizations 130 for some or all of the end users. Any changes to those authorizations 130 may be based on modifications to particular end users and their related master data, such as when an organizational position changes for a particular user, when a responsibility of the end user is modified or updated (e.g., a particular territory to which the end user is assigned), when a new business role is associated with a particular end user, or in response to other organizational events. In some instances, the user authorization determination module 114 may initiate an update in response to a new restriction rule 122 being associated with a particular business role, such that the end user authorizations 130 associated with users associated with the particular business role would then be modified.

The application runtime 116 may be associated with any suitable application, such as an ERP or CRM solution. As requests are received from an end user (e.g., client 170), the application runtime 116 can be used to provide responsive requests. The runtime authorization check module 118 can be used to access the set of end user authorizations 130 for the particular end user associated with the request. The runtime authorization check module 118 can then allow the application runtime 116 to identify and responsively provide the responsive data or information that is allowed based on those end user authorizations 130 associated with the end user. For example, the particular end user may be associated with a particular Territory. If the restriction rule 122 associated with the end user's business role provides access to documents and information associated with a Territory (e.g., Southwest territory) with which the end user is associated, the end user authorization 130 stored in memory 120 will identify that the particular end user can view and interact with documents related to the Southwest territory. In response to a request for documents via the application runtime 116, the runtime authorization check module 118 can perform the comparison to the end user authorizations 130 for the particular end user and can determine and provide for presentation a responsive set of information (assuming the end user is not associated with other Territories) that will include documents associated with the Southwest territory as previously identified and indicated in the end user authorization 130.

As illustrated and described, one or more clients 160 and 170 may be present in the example system 100. In some instances, the differently number clients 160 and 170 may be associated with different types of users. For example, client 160 may be associated with a key user or administrator, or some other user associated with the creation of custom code 128 for customer-defined restriction rules, or with users authorized to interact with one or more business roles, restriction rule 122 assignment to those business roles, or other administrative tasks or operations. Client 170, on the other hand, may be associated with end users interacting with a particular application and receiving responsive information sets in response to queries and requests to the application runtime 116, sent via client application 176.

Each client 160, 170 may be associated with requests transmitted to the authorization system 102 related to the client application 166, 176 executing on or at the client 160, 170. As illustrated, the clients 160, 170 may include an interface 162, 172 for communication (similar to or different from interface 104), a processor 164, 174 (similar to or different from processor 106), the client application 166, 176, memory 168, 178 (similar to or different from memory 120), and a graphical user interface (GUI) 167, 177.

The illustrated clients 160, 170 are intended to encompass any computing device such as a desktop computer, laptop/notebook computer, mobile device, smartphone, personal data assistant (PDA), tablet computing device, one or more processors within these devices, or any other suitable processing device. In general, the clients 160, 170 and their components may be adapted to execute any operating system, including Linux, UNIX, Windows, Mac OS®, Java™, Android™, or iOS. In some instances, the clients 160, 170 may comprise a computer that includes an input device, such as a keypad, touch screen, or other device(s) that can interact with the client application 166, 176, and an output device that conveys information associated with the operation of the applications and their application windows to the user of the clients 160, 170. Such information may include digital data, visual information, or a GUI 167, 177, as shown with respect to the client 160, 170. Specifically, the client 160, 170 may be any computing device operable to communicate queries or communications to the authorization system 102, other clients 160, 170, and/or other components via network 150, as well as with the network 150 itself, using a wireline or wireless connection. In general, clients 160, 170 each comprise an electronic computer device operable to receive, transmit, process, and store any appropriate data associated with the environment 100 of FIG. 1. In some instances, different clients 160, 170 may be the same or different types or classes of computing devices. For example, at least one of clients 170 may be associated with a mobile device (e.g., a tablet), while at least one of the clients 160 may be associated with a desktop or laptop computing system. Any combination of device types may be used, where appropriate.

Client applications 166, 176 may be any suitable application, program, mobile app, or other components. As illustrated, the client applications 166, 176 interacts with the authorization system 102 to perform client-side operations associated with a particular authorization system 102 and its components (e.g., the restriction rule definition module 108 and/or the application runtime 116) via network 150. In some instances, the client application 166, 176 may be a browser, where the functionality of the client application 166, 176 may be realized using a web application or website the user can interact with via the client application 166, 176. In other instances, the client application 166, 176 may be a remote agent, component, or client-side version of the authorization system 102 and/or the application associated with the application runtime 116. In some instances, the client applications 166, 176 may interact directly with the authorization system 102.

GUI 167 of clients 160 and GUI 177 of clients 170 can interface with at least a portion of the environment 100 for any suitable purpose, including generating a visual representation of the client applications 166, 176 and/or the content associated with the client applications 166, 176, as well as visual representations of the application runtime 116 or other operations of the authorization system 102. In particular, the GUIs 167, 177 may be used to present screens or UIs associated with the client applications 166, 176 or authorization systems 102. The GUIs 167, 177 may also be used to view and interact with various Web pages, applications, and Web services located local or external to the clients 160, 170. Generally, the GUIs 167, 177 provide the users with an efficient and user-friendly presentation of data provided by or communicated within the system. The GUIs 167, 177 may comprise a plurality of customizable frames or views having interactive fields, pull-down lists, and buttons operated by the user. For example, the GUIs 167, 177 may provide interactive elements that allow a user to view or interact with information related to the operations of processes associated with the authorization system 102, including the presentation of and interaction with particular application data associated with the client applications 166, 176, the application runtime 116, and/or the restriction rule definition module 108, among others. In general, the GUIs 167, 177 are often configurable, supports a combination of tables and graphs (bar, line, pie, status dials, etc.), and are able to build real-time portals, application windows, and presentations. Therefore, GUIs 167, 177 contemplate any suitable graphical user interface, such as a combination of a generic web browser, a web-enable application, intelligent engine, and command line interface (CLI) that processes information in the platform and efficiently presents the results to the user visually.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
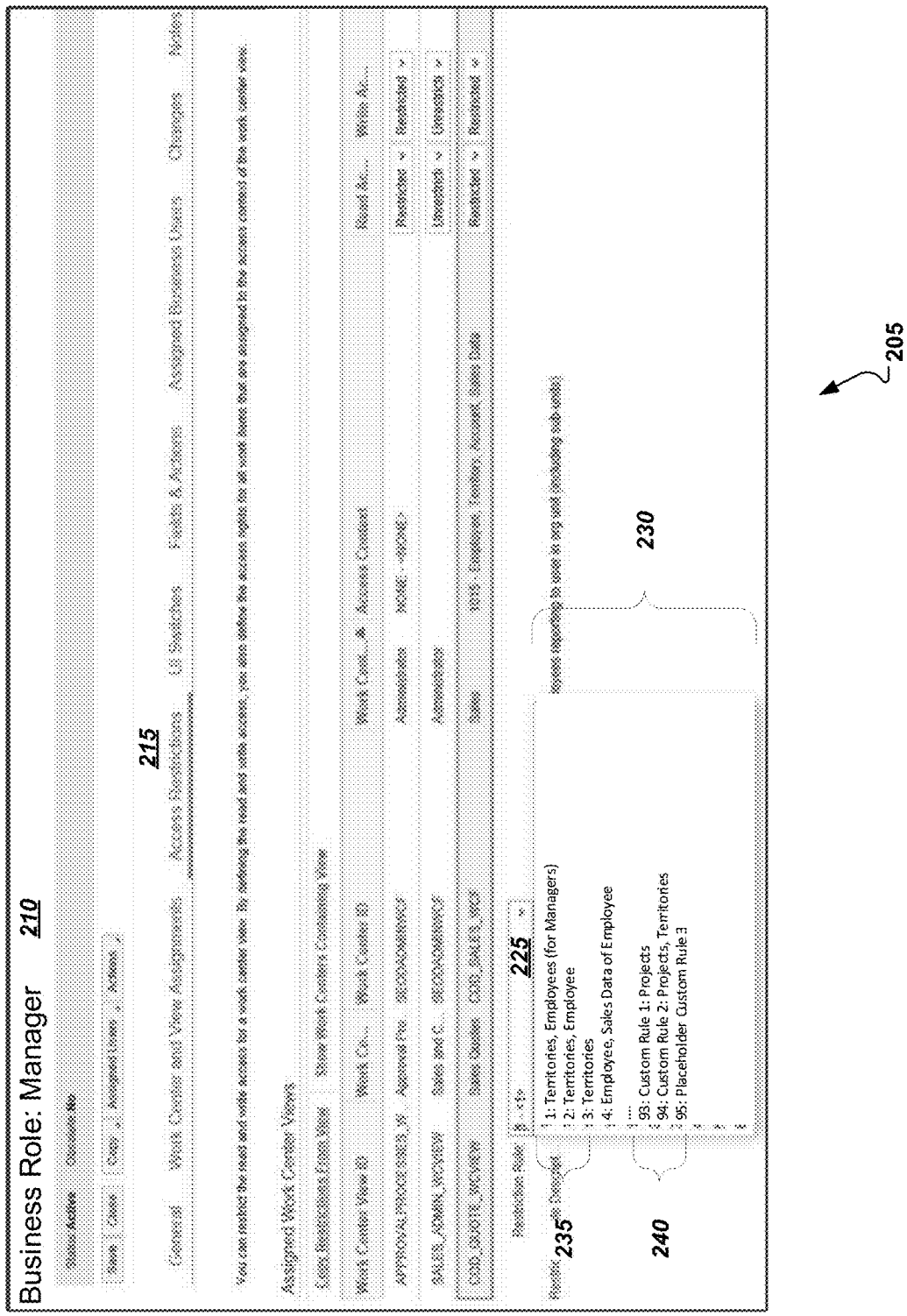
FIG. 2 represents an example screenshot of a user interface for assigning a particular restriction rule to a business role.

FIG. 2 represents an example screenshot of a user interface 205 for assigning a particular restriction rule to a business role. As illustrated, a key user or administrator can perform various operations related to particular business roles. In the illustration of FIG. 2, a key user is interacting with the access restrictions associated with a Manager business role 210. When the access restrictions tab 215 is selected, a set of assigned work center views associated with the particular business role 210 are presented. In addition, a set of restriction rules and corresponding dropdown box 225 are provided. The restriction rules, as described above, allow for particular business roles to be associated with a dynamically determined rule that can then be evaluated and applied individually to each user associated with that business role. As shown, dropdown box 225 provides a list of available restriction rules 230. In response to a particular rule being selected, information about the meaning of those rules can be presented so that the key user or administrator assigning the restriction rule can better understand its meaning.

As illustrated, an illustrated listing 230 of seven restriction rules are provided for selection. The first four rules 235, "Territories, Employees (for Managers), "Territories, Employee", "Territories," and "Employee, Sales Data of Employee," represent predefined restriction rules provided by the software vendor, as these rules may be applied to various different customers. The last three rules 240, "Custom Rule 1: Projects," "Custom Rule 2: Projects, Territories," and "Placeholder Custom Rule" represent the custom rule placeholders used to link at least some of the restriction rules 230 to one or more customer-specific and customer-defined restriction rules. In this illustration, three spots for potential custom rules are provided. In others, more or additional custom rule placeholders may be made available, including an unlimited number in some cases. Newly created custom rules can be associated with a particular custom rule placeholder (e.g., space "93" for Custom Rule 1), where selecting the custom rule can trigger usage and execution of the corresponding custom code (e.g., custom code 128) for creating particular end user authorizations 130. In the illustrated example, only two of the three placeholders have been associated with a particular custom rule, with one placeholder (i.e., Custom Rule 3) available for association with a new custom rule. Each custom rule can be provided a name and description during creation to provide additional information to key users and administrators assigning rules to particular business roles, particularly where those assigning key users and administrators are not the persons or users who defined the custom rule.

Once a restriction rule is selected from the listing 230, the business role can be saved and/or updated. In some instances, in response to a changed restriction rule, the end user authorizations associated with any changes can be updated by dynamically calculating the end user authorizations of end users associated with the selected restriction rule based on the logic of said restriction rule as defined. The benefit of the custom restriction roles is that they provide a customer-specific implementation of a customer-required restriction rule that is not otherwise available from the software vendor. For example, if the customer has added a new business object not included in the original software version, such as the "Project" business object described herein, no restriction rules may be otherwise available for application as a restriction. By allowing the custom restriction rules to be defined, key users and administrators can associate business objects with these customer-specific business objects and other master data. In doing so, customers can provide relevant and not previously-available restrictions to access based on either or both existing and customer-defined master data.

Figure 3:
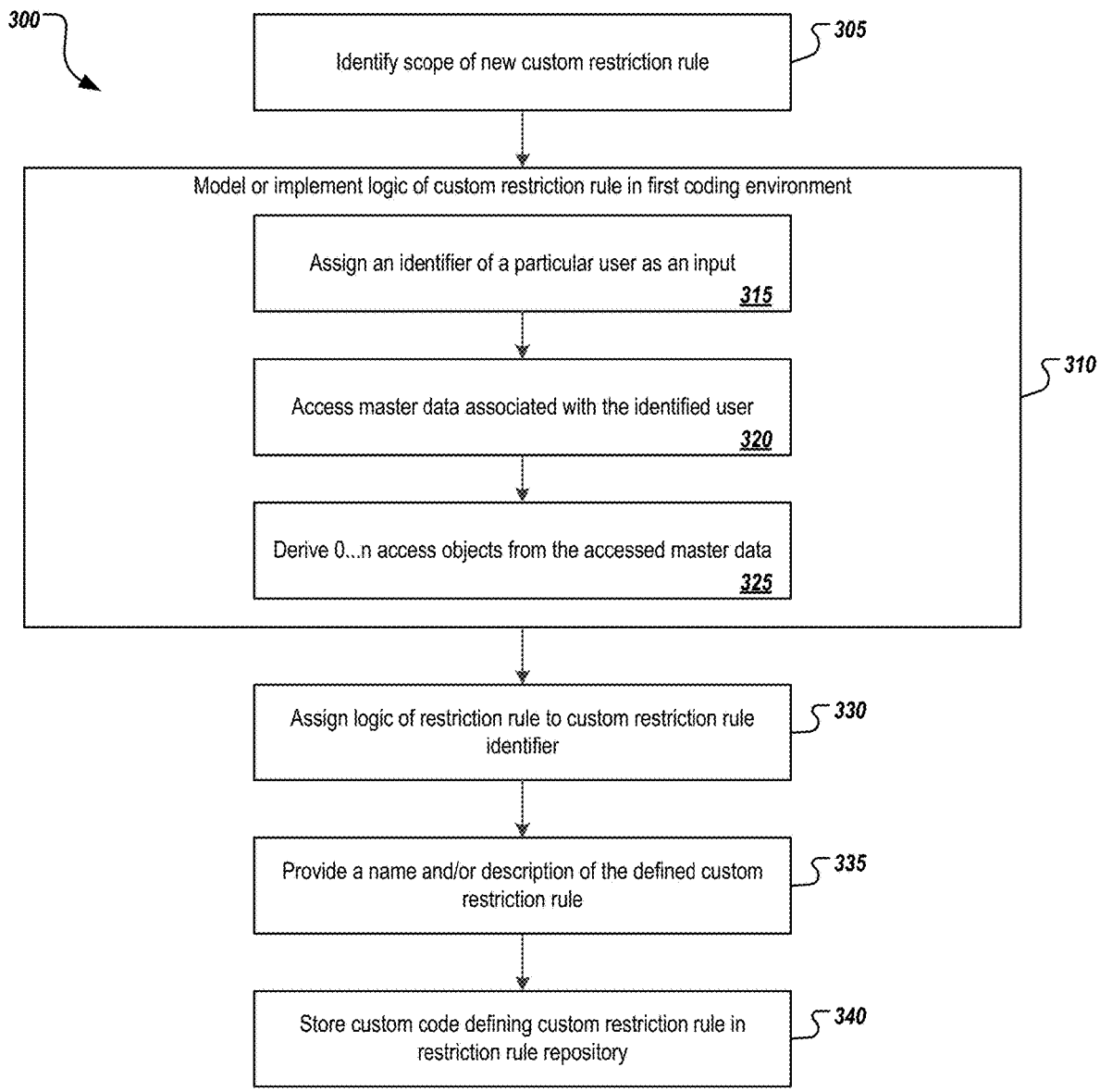
FIG. 3 represents an example flow for creating a custom restriction rule in one implementation.

FIG. 3 represents an example flow for creating a custom restriction rule in one implementation. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate.

At 305, a scope of a new custom restriction rule can be identified. In some instances, identifying the scope of the new custom restriction rule may be performed via a user interface within the enterprise application to identify a particular set of master data to use for particular restrictions on one or more end users' access to a particular set of information within the enterprise application. In some instances, identifying the scope may be performed offline. Scoping may be performed by an administrator or end user associated with security for the enterprise application, particular with security and data protection as it relates to access to business-related information for particular end users associated with particular business roles.

At 310, the custom restriction rule can be model or implemented in particular logic within a first coding environment. Creating the custom restriction rule can be performed, alternatively, in a configuration table environment, using a modeling tool, or in other suitable location or tool. In some instances, modeling the custom restriction rule can include several operations. As illustrated, an identifier of a particular user identifier can be assigned as an input to the custom restriction rule at 315. The identifier may be a UUID of the user associated with the business role assigned to the custom restriction rule, and will be used to access the master data and determine the appropriate authorizations to provide to an end user.

At 320, code or instructions associated with accessing particular master data with relation to the identified user can be determined. In some instances, the particular master data relevant to the custom restriction rule may be existing master data, such that the method of accessing the particular master data may be known based on existing APIs or other code or accessing methods. When the particular master data relevant to the custom restriction rule is at least partially associated with customer-defined master data created at the customer, additional information regarding how to access that master data may need to be defined. As one example, a key user wants to grant access for sales quotes to all employees where the user is on the same project team. First the employeeID is determined from the UserUUID. Then all relevant projects are selected—they have this matching EmployeeID in the Project team list. Finally, all employees of those projects are read. At 325, 0 to n (where n is an integer) access objects may be derived from the accessed master data to identify the particular logic associated with the custom restriction rule. The access objects may include, for example, EmployeeUUID, OrgUnitUUID, TerritoryUUID, etc. The sales quote has a separate list of such UUIDs. If there is an interaction of this list of a quote with the list of UUIDs the user is authorized for, then the user is authorized for the particular sales quote.

In one example, a new business object "Project" may be defined by the customer and can be associated with the custom restriction rule. The access objects may identify that end users associated with the custom restriction rule can access any project in which they are a team member. When the custom restriction rule is evaluated, the user authorization determination module (e.g., 114) can determine for each user associated with a business role for which the custom restriction rule is associated, their particular unique identifier (e.g., an organization identifier or UUID) as the input to the evaluation. The module can then access the master data associated with the rule (here, the Project business object) and determine in which projects the current user is a team member. Once that is determined, the module can generate end user authorizations to view information (e.g., sales quotes) associated with each of those projects to which the current user is associated or a member. This end user authorization is available at runtime in many cases, such that when information about sales quotes is requested by the user, the user is provided access to those sales quotes based on the end user authorizations previously generated, such that only information about sales quotes associated with projects to which the end user is a team member is provided or made available.

Returning to 300, once the logic is defined for a particular custom restriction rule, the logic (or custom code) can be assign to a custom restriction rule identifier at 330. This assignment can be to one of the custom rule placeholders made available within a larger set of restriction rules, including a set of predefined restriction rules provided by the software vendor. At 335, a name and/or a description of the defined custom restriction rule can be provided and associated with the custom restriction rule identifier. Once the custom restriction rule is defined, associated with an identifier, and given a name and/or description, the custom code defining the custom restriction rule can be stored in a restriction rule repository at 340. When the custom restriction rule is associated with a particular business role and evaluated at a later time, the evaluation logic can identify a link to the custom code separate from the predefined restriction rules and access the custom code defining how and what to base the evaluation of the custom restriction rule.

Figure 4:
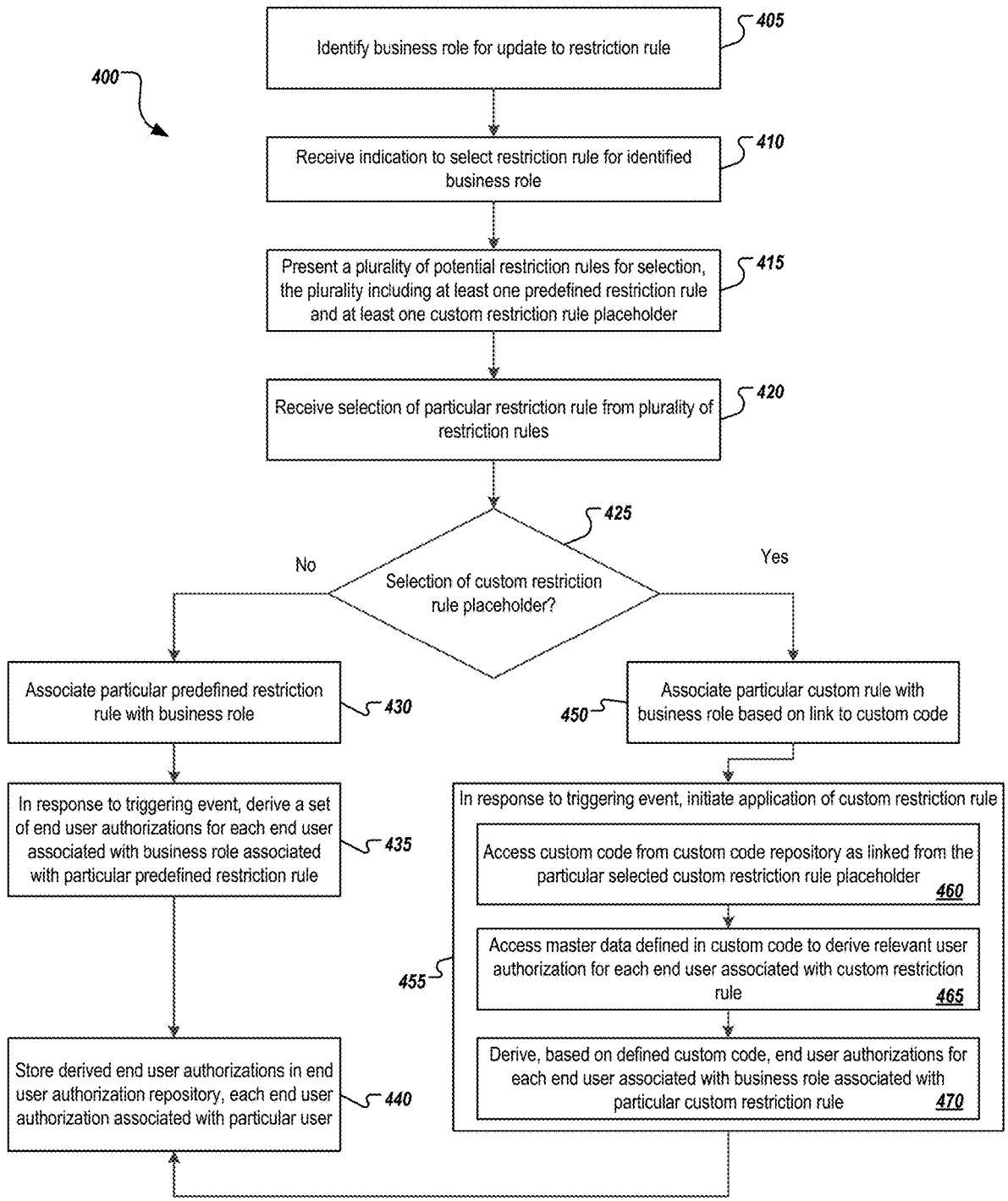
FIG. 4 represents an example flow for selecting a particular custom restriction rule from a plurality of restriction rules to apply the selected custom restriction rule to a particular business role.

FIG. 4 represents an example flow for selecting a particular custom restriction rule from a plurality of restriction rules to apply the selected custom restriction rule to a particular business role. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate.

At 405, a business role is identified for an update or modification to a restriction rule associated therewith. In some instances, a UI similar to the UI provided in FIG. 2 may be provided. At 410, an indication is received to provide an option to select one of a plurality of restriction rules to be applied to or associated with the identified business role. In response to the indication, a plurality of potential restriction rules can be presented or otherwise provided for presentation to an interface for selection at 415. In some instances, the presentation may be associated with a dropdown listing, a configuration table, or any other suitable presentation. In some instances, the UI may be associated with a configuration of a particular business role and its access rights or access restrictions.

At 420, a selection of a particular restriction rule from the plurality of restriction rules can be received. The selection may be any suitable selection or indication provided via a suitable interface, including the selection of a particular restriction rule from the plurality of restriction rules. In some instances, the selection may be received via a touch input, a click-based input, a verbal input, or in any other suitable manner.

At 425, a determination is made as to whether the selected restriction rule represents a predefined restriction rule as provided by the software vendor or whether the selected restriction rule represents a custom restriction rule placeholder from the presented list. In response to a determination that a predefined restriction rule is selected, method 400 continues at 430. At 430, the particular selected predefined restriction rule is associated with the business role. In response to a suitable triggering event, a set of end user authorizations for each end user associated with the business role for which the predefined restriction rule is now associated can be derived at 435. The triggering event may comprise an indication of completion of the business role modifications, such as a save event. The save event may be the triggering event, and may cause the restriction rule to be evaluated for at least the end users associated with the business role identified at 405. In other instances, the triggering event may be periodic action that occurs at predefined or changing intervals of time. The triggering event may be specifically associated with the identified business role, while in other instances, the triggering event may cause all or multiple business roles and their corresponding restriction rules to be evaluated when the triggering event occurs. In some instances, the triggering event may be a manual indication from a key user or administrator separate from the association of a particular restriction rule to a particular business role.

Once the set of end user authorizations are derived, those derived authorizations can be stored in an end user authorization repository at 440. In some instances, the authorizations can be specifically associated with a particular end user, such that at runtime, when an end user requests a particular set of data or information, the runtime application can access the end user's specific set of authorizations to determine whether the end user can access the requested data or information, or what portion of the requested data or information can be provided back to the end user.

Returning to 425, in response to determining that a custom restriction rule placeholder has been selected at 420, method 400 continues at 450. As noted, each custom restriction rule placeholder can be associated with a link to custom code defining the logic and/or implementation of the custom restriction rule. At 450, the particular custom rule associated with the selected custom restriction rule placeholder can be associated with the identified business role. At 455, in response to a triggering event, the application or authorization calculation run associated with at least the identified business role can be performed.

The process for evaluating custom restriction rules may differ from the evaluation of the predefined restriction rules. At 460, the custom code associated with the custom restriction rule placeholder can be accessed based on the link to the code included in the custom restriction rule placeholder. At 465, the master data defined in the custom code to derive the relevant user authorizations is accessed, and at 470 a set of end user authorizations for each end user associated with the business role with the custom restriction rule are generated. Method 400 then continues at 440, where those derived authorizations can be stored in an end user authorization repository at 440. Once the evaluation has been performed and the end user authorizations are stored, the runtime application of those end user authorizations, whether based on a predefined restriction rule or on a custom restriction rule, are performed in a similar manner.

Figure 5:
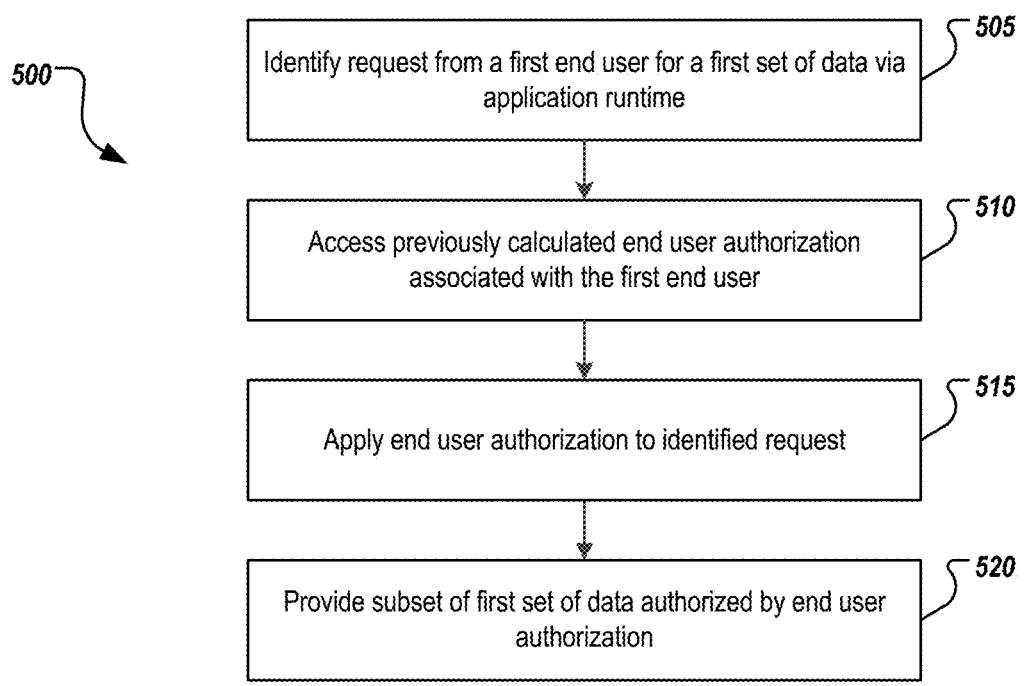
FIG. 5 represents an example flow for evaluating a request for information from an end user at runtime based on a set of end user-specific authorizations.

FIG. 5 represents an example flow for evaluating a request for information from an end user at runtime based on a set of end user-specific authorizations. For clarity of presentation, the description that follows generally describes method 500 in the context of the system 100 illustrated in FIG. 1. However, it will be understood that method 500 may be performed, for example, by any other suitable system, environment, software, and hardware, or a combination of systems, environments, software, and hardware as appropriate.

At 505, a request from a first end user for a first set of data is identified via an application runtime. The application may be any suitable application, including enterprise software including one or more of an ERP system, a CRM system, or any other suitable application or software. In some instances, the identified request may comprise a general request for data, such as a request for a current worklist for the end user or a general type of document or file.

In response to identifying the request, at 510 a previously-calculated end user authorization definition associated with the first end user is accessed. The end user authorization definition may be generated as described in FIG. 1 or in FIG. 4, where the authorization is based on the end user's business role, a particular restriction rule associated with that business role, and a determination of user-specific information associated with master data of the application. The end user authorization definition may be updated periodically, in response to the assignment of a particular restriction rule to a business role, changing master data associated with a set of end users, or in response to a manual request to update at least some of the end user authorizations, as well as in response to any other triggering event.

At 515, the end user authorization associated with the first user can be applied to the identified request. In some instances, the authorization can act as a filter, reducing the first set of data requested to only a subset of the first set of data based on that data to which the first end user is authorized. That subset of the requested first set of data can be provided at 520, where the subset includes only the portion of the requested first set of data authorized for viewing by the end user based on the end user authorization. In some instances, the subset of the requested first set of data may be the complete first set of data where the end user is authorized for all.

An example request may be for a set of Sales Quotes. Based on the restriction rule and the end user authorization for a particular end user, a determination can be made as to which Sales Quotes the end user is allowed to view. In one instance, the end user can see all Sales Quotes related to a particular Project in which the end user is a team member, and any other Sales Quotes will not be provided.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method executed by at least one processor, the method comprising:
    presenting, via a user interface, a listing of a plurality of restriction rules for association with a particular business role, the business role associated with at least one end user in an enterprise software system executed by a customer, the listing of the plurality of restriction rules including at least one predefined restriction rule and at least one custom restriction rule placeholder, wherein each of the at least one predefined restriction rules are delivered with the enterprise software system and defined by a software vendor providing the enterprise software system, and wherein each of the at least one custom restriction rule placeholders are associated with a link to custom code developed as a customer-specific restriction rule;
    receiving, via the user interface, an indication of a selection of a particular custom restriction rule placeholder from the listing of the plurality of restriction rules;
    associating the selected particular custom restriction rule placeholder with the particular business role;
    in response to a triggering event associated with an evaluation of the restriction rule for the particular business role:
        accessing the custom code linked to the particular custom restriction rule placeholder;

accessing a set of customer-defined master data identified by the custom code, wherein the customer-defined master data identifies a set of parameters identifying at least one business role associated with each of the end users, and wherein the customer-defined master data was defined by the customer after delivery of the enterprise software system and extends a pre-existing set of master data provided with delivery of the enterprise software system;

determining, based at least in part on the set of customer-defined master data, restrictions to be associated with each of the end users associated with the particular business role; and deriving, based on logic defined within the custom code, a set of access objects based on the determined restrictions, the set of access objects to be associated with each end user; and generating, for each end user associated with the identified business role, an end user authorization identifying the set of access objects authorized for the particular end user to access at runtime.

2. The method of claim 1, wherein the triggering event comprises a save action associated with an updated business role after the association of the selected custom restriction rule.

3. The method of claim 1, wherein the triggering event comprises a periodic restriction rule evaluation.

4. The method of claim 1, wherein the triggering event comprises an assignment of a new business role to a user.

5. The method of claim 1, the method further comprising, in response to receiving a request at runtime for a set of data, the request associated with a first end user:

determining a first subset of the requested set of data included in the generated end user authorization associated with the first end user;

determining a second subset of the requested set of data that is not included in the generated end user authorization associated with the first end user; and providing the first subset of the requested set of data in the response to the request while excluding the second subset of the requested set of data.

6. The method of claim 1, wherein the listing of the plurality of restriction rules including at least one custom restriction rule placeholder provided by a partner to the customer, the at least one customer restriction rule placeholder provided by the partner developed as a partner-defined restriction rule and made available for use by the customer.

7. The method of claim 1, wherein the logic defined within the custom code analyzes at least one business object or at least one extension field included in the customer-defined master data that was created after delivery of the enterprise software system to derive the set of access objects.

8. A system comprising:
at least one processor; and
a memory communicatively coupled to the at least one processor, the memory storing instructions which, when executed, cause the at least one processor to perform operations comprising:

presenting, via a user interface, a listing of a plurality of restriction rules for association with a particular business role, the business role associated with at least one end user in an enterprise software system executed by a customer, the listing of the plurality of restriction rules including at least one predefined restriction rule and at least one custom restriction rule placeholder, wherein each of the at least one predefined restriction rules are delivered with the enterprise software system and defined by a software vendor providing the enterprise software system, and wherein each of the at least one custom restriction rule placeholders are associated with a link to custom code developed as a customer-specific restriction rule;

receiving, via the user interface, an indication of a selection of a particular custom restriction rule placeholder from the listing of the plurality of restriction rules;

associating the selected particular custom restriction rule placeholder with the particular business role;

in response to a triggering event associated with an evaluation of the restriction rule for the particular business role:

accessing the custom code linked to the particular custom restriction rule placeholder;

accessing a set of customer-defined master data identified by the custom code, wherein the customer-defined master data identifies a set of parameters identifying at least one business role associated with each of the end users, and wherein the customer-defined master data was defined by the customer after delivery of the enterprise software system and extends a pre-existing set of master data provided with delivery of the enterprise software system;

determining, based at least in part on the set of customer-defined master data, restrictions to be associated with each of the end users associated with the particular business role deriving, based on logic defined within the custom code, a set of access objects based on the determined restrictions, the set of access objects to be associated with each end user; and generating, for each end user associated with the identified business role, an end user authorization identifying the set of access objects authorized for the particular end user to access at runtime.

9. The system of claim 8, wherein the triggering event comprises a save action associated with an updated business role after the association of the selected custom restriction rule.

10. The system of claim 8, wherein the triggering event comprises a periodic restriction rule evaluation.

11. The system of claim 8, wherein the triggering event comprises an assignment of a new business role to a user.

12. The system of claim 8, the operations further comprising, in response to receiving a request at runtime for a first set of data, the request associated with a first end user:

determining a first subset of the requested set of data included in the generated end user authorization associated with the first end user;

determining a second subset of the requested set of data that is not included in the generated end user authorization with the first end user; and providing the first subset of the requested set of data in the response to the request while excluding the second subset of the requested set of data.

13. The system of claim 8, wherein the listing of the plurality of restriction rules including at least one custom restriction rule placeholder provided by a partner to the customer, the at least one customer restriction rule placeholder provided by the partner developed as a partner-defined restriction rule and made available for use by the customer.

14. A non-transitory computer-readable medium storing instructions which, when executed, cause at least one processor to perform operations comprising:

presenting, via a user interface, a listing of a plurality of restriction rules for association with a particular business role, the business role associated with at least one end user in an enterprise software system executed by a customer, the listing of the plurality of restriction rules including at least one predefined restriction rule and at least one custom restriction rule placeholder, wherein each of the at least one predefined restriction rules are delivered with the enterprise software system and defined by a software vendor providing the enterprise software system, and wherein each of the at least one custom restriction rule placeholders are associated with a link to custom code developed as a customer-specific restriction rule;

receiving, via the user interface, an indication of a selection of a particular custom restriction rule placeholder from the listing of the plurality of restriction rules;

associating the selected particular custom restriction rule placeholder with the particular business role;

in response to a triggering event associated with an evaluation of the restriction rule for the particular business role:

accessing the custom code linked to the particular custom restriction rule placeholder;

accessing a set of customer-defined master data identified by the custom code, wherein the customer-defined master data identifies a set of parameters identifying at least one business role associated with each of the end users, and wherein the customer-defined master data was defined by the customer after delivery of the enterprise software system and extends a pre-existing set of master data provided with delivery of the enterprise software system;

determining, based at least in part on the set of customer-defined master data, restrictions to be associated with each of the end users associated with the particular business role; and deriving, based on logic defined within the custom code, a set of access objects based on the determined restrictions, the set of access objects to be associated with each end user; and generating, for each end user associated with the identified business role, an end user authorization identifying the set of access objects authorized for the particular end user to access at runtime.

15. The computer readable medium of claim 14, wherein the triggering event comprises a save action associated with an updated business role after the association of the selected custom restriction rule.

16. The computer readable medium of claim 14, wherein the triggering event comprises an assignment of a new business role to a user.

17. The computer readable medium of claim 14, the operations further comprising, in response to receiving a request at runtime for a set of data, the request associated with a first end user:

determining a first subset of the requested set of data included in the generated end user authorization associated with the first end user;

determining a second subset of the requested set of data that is not included in the generated end user authorization associated with the first end user; and providing the first subset of the requested set of data in the response to the request while excluding the second subset of the requested set of data.

18. The computer readable medium of claim 14, wherein the listing of the plurality of restriction rules including at least one custom restriction rule placeholder provided by a partner to the customer, the at least one customer restriction rule placeholder provided by the partner developed as a partner-defined restriction rule and made available for use by the customer.

* * * * *